July 20, 1965  L. E. BELCASTRO  3,196,258
COUNTER STEP CHECKING
Filed June 2, 1960  5 Sheets-Sheet 1
FIG. 1
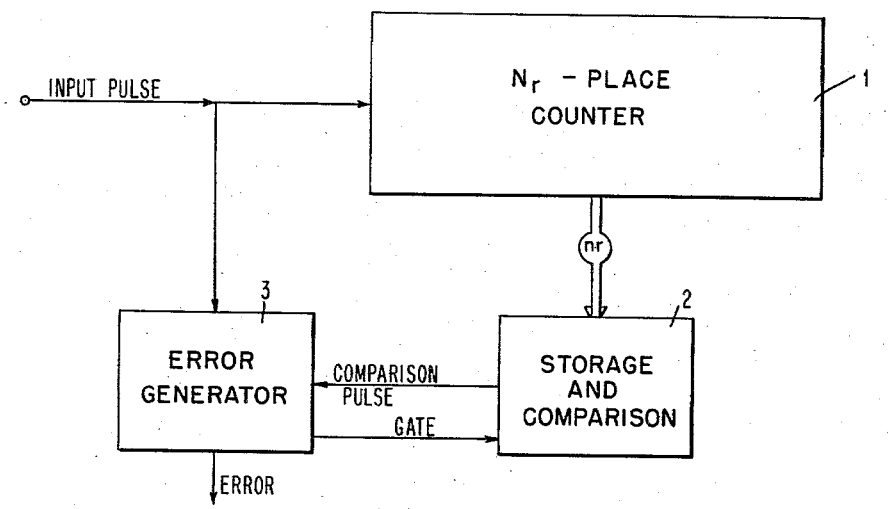
FIG. 2
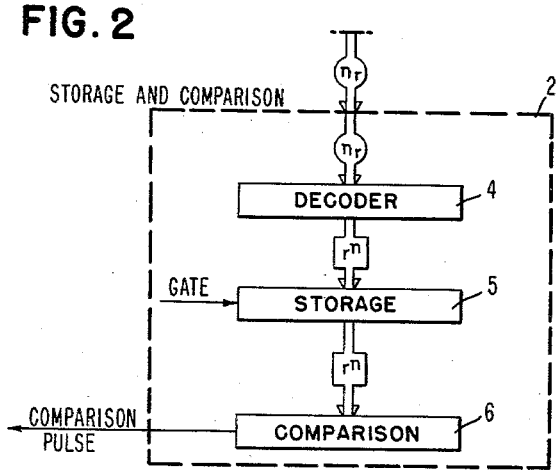
FIG. 3b
→▶ + GOING PULSE
→▷ − GOING PULSE
→◆ + LEVEL
→◇ − LEVEL
→ MISCELLANEOUS
FIG. 3a
DOUBLE LINE TRANSFER
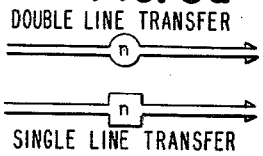
SINGLE LINE TRANSFER
INVENTOR
LOUIS E. BELCASTRO
BY
*Gunt A. Hauptman*
ATTORNEY July 20, 1965  L. E. BELCASTRO  3,196,258
COUNTER STEP CHECKING
Filed June 2, 1960  5 Sheets-Sheet 3

July 20, 1965

L. E. BELCASTRO 3,196,258

COUNTER STEP CHECKING

Filed June 2, 1960

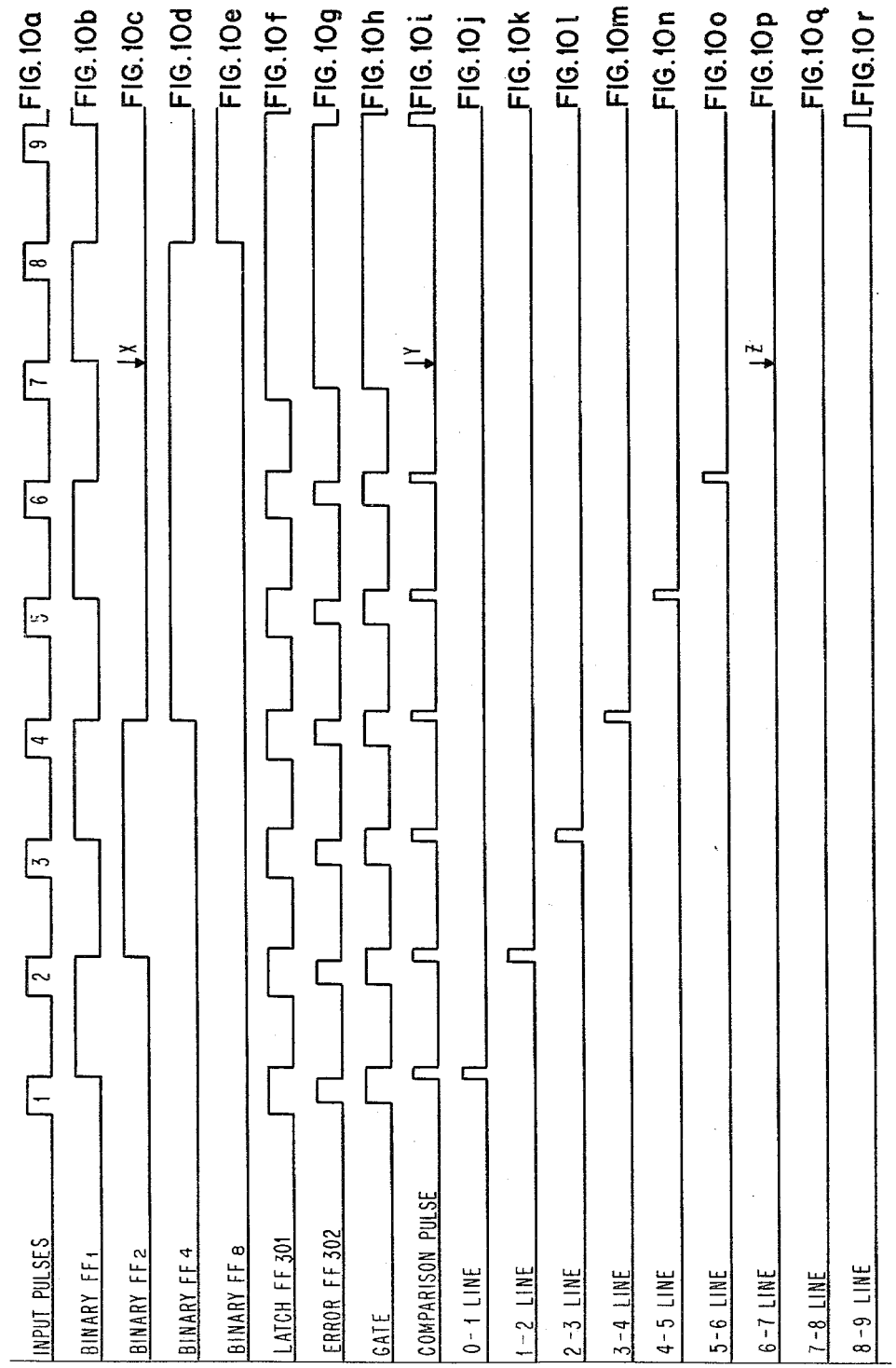

3,196,258
COUNTER STEP CHECKING

Louis E. Belcastro, Wappingers Falls, N.Y., assignor to International Business Machines Corporation, New York, N.Y., a corporation of New York
Filed June 2, 1960, Ser. No. 33,522
3 Claims. (Cl. 235—153)

This invention relates to checking circuits, and more particularly to apparatus for checking the stepping sequence of a counter.

Counters are important elements in computers. They store numbers in the form of coded electrical or magnetic states, which may be changed in a predetermined sequence by input pulses. A common counting scheme, utilizing the binary system, has a series of bistable stages each representative of one binary place. Each possible combination of states is identifiable as a different number, which number may be raised, or lowered, by an input stepping pulse. Thus the number of stepping pulses applied may be recorded in the counter.

A common failing of counters is that an input stepping pulse does not result in the correct change of state, either failing to change the present state or skipping the next state in the sequence and going to some other one in the sequence. For example, if the state of a counter is equivalent to the binary number 0111 (decimal 7), an input pulse having the binary value plus 0001 (decimal 1) should cause the counter to go to binary 1000 (decimal 8). If the input pulse for some reason has no effect, the quantity stored in the counter stays the same. If the fourth place bistable device has failed, the counter will contain a binary 0000 (decimal 0). If the first stage bistable device fails to switch, the contents will be a binary 1001 (decimal 9).

An error introduced into a computer by a counter in this way must be multiplied during subsequent operations to a point where the final answer becomes worthless. Most prior art devices for checking counters have been useful only with counters where only one bistable stage at a time is ON in normal operation. Other such devices require second counters for checking, or special stepping circuits.

An object of the invention is to check the stepping sequence of a counter.

Another object of the invention is to check the contents of a counter before and after stepping.

A further object of the invention is to provide an error signal if the changes of states of a counter do not follow a predetermined sequence.

Still another object of the invention is to compare the states of a counter before and after stepping.

A still further object of the invention is to provide an error indication upon the failure of a counter to step between states equivalent to adjacent decimal numbers.

Another object of the invention is to practice a method for checking a counter's stepping sequence.

The foregoing and other objects, features and advantages of the invention will be apparent from the following more particular description of preferred embodiments of the invention, as illustrated in the accompanying drawings.

The apparatus of this invention achieves these objects in a simple manner. Each input pulse should step the counter from one state to some other state. By recording the states of the counter both before and after an input pulse it becomes possible to compare the two stored states for correctness. If a pulse is generated for each correct step then the absence of such a pulse indicates a stepping error.

The comparison operation is simplified by converting the counter output to the decimal system. Stepping of the decimal values may then be arranged to occur between adjacent numbers. If the decimal equivalents of the counter contents before and after stepping are stored, logic circuits may emit a pulse whenever adjacent storage positions are occupied. An error in stepping has occurred if no pulse is generated.

A signal indicative of the failure of a stepping pulse to correctly step the counter may be generated by any device that detects an absence of a pulse arising from a transition of the demical equivalents of the counter contents between adjacent storage positions.

In the figures:

FIG. 1 is a block diagram showing the invention connected to a counter.

FIG. 2 is a more detailed block diagram of the part of the invention labeled "Storage and Comparison" in FIG. 1.

FIGS. 3a, 3b, 4a to 4e show symbols used in explaining the invention.

FIG. 6b is a logic diagram of another embodiment of the part of the invention shown in FIG. 6a.

Figure 8:
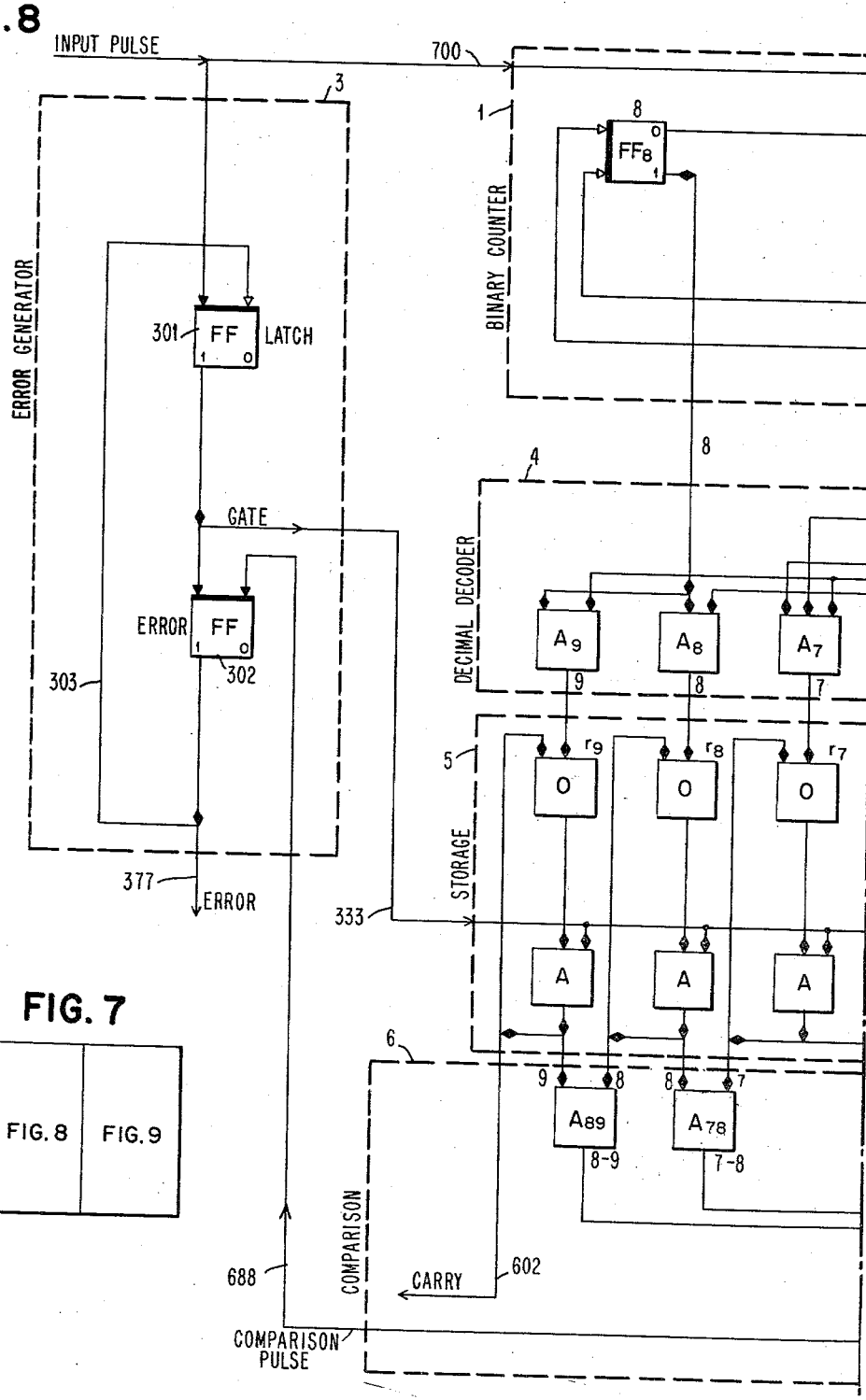
Figure 7:
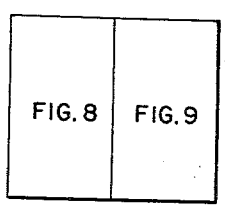
FIG. 7 shows the manner of arranging FIGS. 8 and 9.
Figure 9:
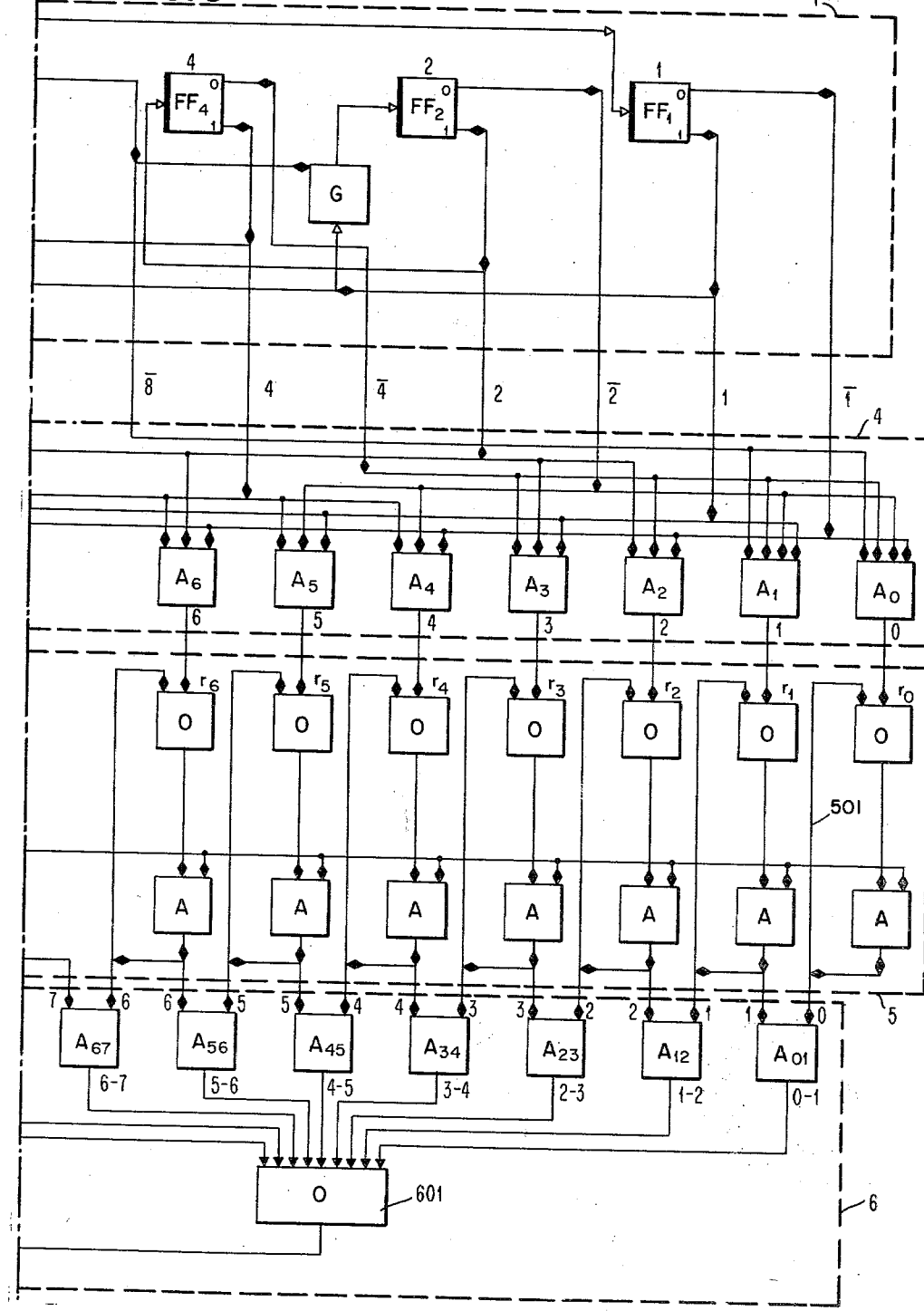

FIG. 8 and FIG. 9, when arranged in the manner shown in FIG. 7 are a schematic showing a typical embodiment of the invention.

FIGS. 10a to 10r are drawings of the waveforms present in various portions of the circuit shown in FIGS. 8 and 9.

FIG. 1 shows an r-radix counter 1 having n digit places. Each input pulse increases the value of the quantity stored in the counter by some fixed amount. For example, counter 1 may be defined as binary ($r=2$) and may be limited to four digit places ($n=4$), with each input pulse defined as a plus or minus one. Then, if the contents of the counter are 0001 before an input pulse, the counter should read 0010 after a plus one input pulse.

Storage and comparison means 2 store the counter contents before and after each input pulse, comparing the stored information for accuracy of stepping. In the example, a comparison pulse is emitted by the storage and comparison means if the counter stepped from 0001 to 0010 or to 0000, but not otherwise. As long as the input pulse causes the counter to step the proper quantity (whether forward or backward), a pulse will be generated.

Error generator 3 generates a signal indicative of a counter stepping error, whenever the storage and comparison means 2 fails to emit a comparison pulse. The error generator may act as a missing pulse detector to look for a missing pulse, or it may act as a gate. In the latter case each pulse from the storage and comparison means blocks the passage of one input pulse through the generator. A failure to block, results in a signal which stands for an error.

FIG. 2 shows the storage and comparison means 2 in more detail. The decoder 4 is available if desired to convert the counter code to some more convenient number system. It may be made to give a straight-through one-to-one conversion, or it may be removed altogether. Since thought is simpler in the decimal system and because the counter 1 has been chosen to be a binary counter, let the decoder 4 be a binary to decimal converter for purposes of explanation. In the example, the four place binary counter permits counting from zero to the decimal number fifteen. Thus the storage circuit 5 comprises a maximum of sixteen storage sections. Usually only ten such sections are provided, for the decimal values zero to nine. If the storage circuit 5 is gated open for a period extending from before to after the counter input pulse, then there should be recorded in storage two decimal numbers. In the example where the counter stepped from 0001 to 0010, the storage circuit 5 contains the numbers one and two.

The comparison means 6 compares the two quantities stored in the storage circuit 5. These two quantities represent the counter contents before stepping and after stepping, and may be in any numerical code. If the decimal system is used for storage, then the comparison operation is quite simple: the decimal number stepping sequence is from one number to the next adjacent number in the direction stepped. The simplest comparator therefore checks for the presence of any two adjacent quantities in storage. In the example, one and two are adjacent decimal quantities. A correct comparison results in the emission of a comparison pulse.

Note that the simplest comparison operation is that of checking for the presence of adjacent decimal numbers equivalent to the value of the contents of the counter before stepping and after stepping. This operation detects a failure to step, as well as "skipping" to an incorrect number. It does not detect stepping "DOWN" on an "UP" (plus) input pulse or stepping "UP" on a "DOWN" (minus) input pulse. Such an error is relatively rare. Further, in order to detect "reverse stepping," the simplicity of the comparison means 6 is lost. A more complex circuit for achieving this extra comparison, and still retaining the ability to function for both counting up and counting down, is probably not warranted by the small probability of a reverse step. However such a circuit is easily designed by using internal blocking circuits to prevent storage in a storage section on the "wrong" side of the storage section corresponding to the counter state before stepping.

FIG. 3a shows nomenclature used to describe the operation of the invention illustrated in FIGS. 1 and 2. A pair of parallel lines interrupted by a circle containing a symbol, indicates a double line transfer between two units. The symbol indicates the number of double lines. A counter stage has two lines leaving it. One line is the complement of the other. Thus an $n$ place counter has $n$ true number lines and $n$ complement lines leaving it. This is indicated by an $n$ in the circle. A square instead of a circle indicates that only one set of lines connect two units; the true number lines being used in this application. The symbols used in FIGS. 1 and 2 illustrate a special case and are not meant as a limitation.

The operation of the invention illustrated in FIGS. 1 and 2 will now be described.

Application of an input pulse to the $r$-radix $n$-place counter should step it from one state to another state in a sequence of distinguishable states. The accuracy of the stepping is indicated by the *form* of the error signal emitted by the error generator 3.

Next, the contents of the counter are gated to the storage circuit 5, twice for each input stepping pulse: once just before the counter should step and once just after the counter should step. The storage circuits may store the counter contents in the same code as the counter, or in any convenient code. The decoder 4 provides any conversion desired. Transfers between counter and decoder are preferably on $n$ double lines to simplify the decoder design. Transfers between the decoder and the storage circuit are conventionally on $r^n$ single lines, if the decoder output is in the decimal system. That is, a bniary four place counter will have eight lines (half true and half complement) entering a decimal decoder, and sixteen lines (all true values) will leave the decoder.

After stepping should be completed, the contents of the storage circuit 5 are compared for each input pulse by the comparison means 6. The rules of comparison are that two numbers, equivalent to adjacent decimal numbers, should be recorded in the storage circuit. If the decoder 4 is used to convert the counter contents to decimal equivalents, then the comparison is made between adjacent storage sections within the storage circuit, there then being the same number of lines connecting the storage circuit to the comparison means as to the decoder. For each correct comparison, a comparison pulse is transmitted. No pulse is emitted if the comparison is incorrect.

An error signal, indicating a failure of an input pulse to step the counter in the desired sequence, is derived from the comparison pulse in the error generator 3. This operation may be accomplished by searching for "missing" comparison pulses, with a standard "missing pulse detector." Such a detector emits an output only when an expected pulse fails to appear. Another approach is to generate an output for each input pulse, but to block each such output with a comparison pulse. Thus, the absence of a comparison pulse is indicated by an output of longer duration than usual. This form of error signal is useful in some computer applications because of its inexpensiveness. If a neon light is operated by the error pulse, its frequency of operation will be too rapid for the human eye, unless there is an error. In the latter case, by adjusting the timing, the comparison pulse can be made to completely block any output. In summary, an error signal denotes failure of the counter to step as desired, as well as indicating most failures in the checking circuit.

Apparatus for practicing the method of this invention will now be described. FIGS. 3b, 4a to 4g show nomenclature used to describe the apparatus.

FIG. 3b shows arrow heads used to indicate the portion of a signal which operates a device. Thus, if a filled-in triangle points into a device, that device is operated only when the signal on the input line is rising positive. It is not operated in any other case, though other signals are present on the line. An empty triangle pointing into a circuit means that the circuit is operated only if the signal on the input line is falling negative. A filled-in diamond indicates that the circuit pointed at is operated only by a positive level, and an empty diamond refers to a negative level. The plain arrow lead means any or all of these things.

Figure 4A:
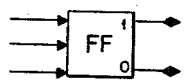

FIG. 4a shows the logic symbol for a flip-flop (FF). A positive going pulse on the left line corresponding to the "1" output, sets the FF to "1." A positive going pulse on the left line corresponding to the "0" output, sets the FF to "0." A positive going pulse on the middle left line complements the FF. That is, if it is set to "1" the complement input sets it to "0;" and if it is set to "0," the complement input sets it to "1." and "0" outputs conventionally appear as positive levels. Either output may, however, be utilized by a connecting device for its negative level, or its positive or negative going pulses.

Figure 4B:
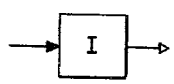

FIG. 4b illustrates an inverter circuit. The output is the inverse of the input, all positive levels being changed to negative levels, positive going pulses to negative going pulses, etc.

Figure 4C:
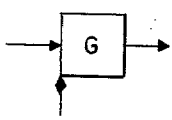

FIG. 4c symbolizes a gate. A pulse (positive going is shown) passes through the gate only when a level (positive shown) is present on the bottom line.

Figure 4D:
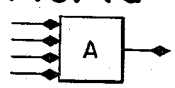

FIG. 4d is a drawing of the symbol for an AND circuit. In this particular drawing, the right hand line has a positive level output only when all the left hand input lines are positive. The output is not positive in any other case. AND circuits may operate on positive or negative going pulses also.

Figure 4E:
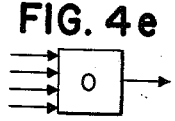

FIG. 4e symbolizes an OR circuit. The right hand output line is positive going whenever any number of left hand input lines are positive going. It is not positive going only in the case when none of the input lines are positive going. Levels may be used with OR circuits also.

Standard cathode follower type circuits may be provided for amplification and isolation whenever desirable in the invention.

Figure 5:
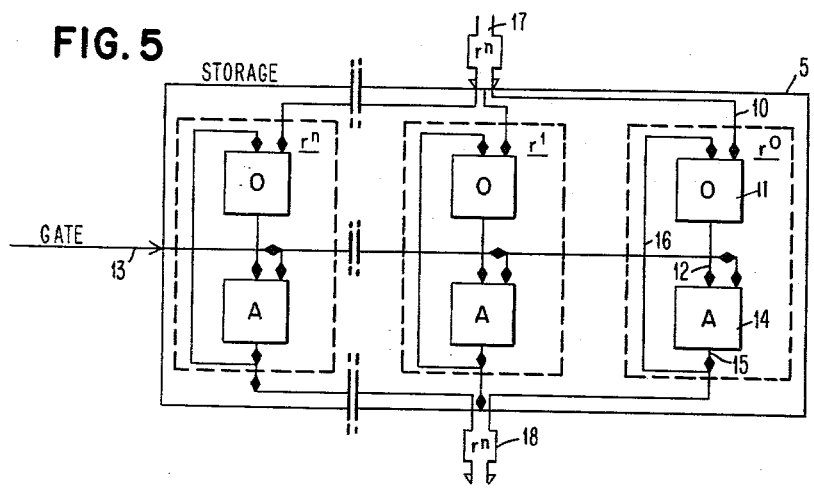
FIG. 5 is a logic diagram of the part of the invention labeled "Storage" in FIG. 2.
Figure 6A:
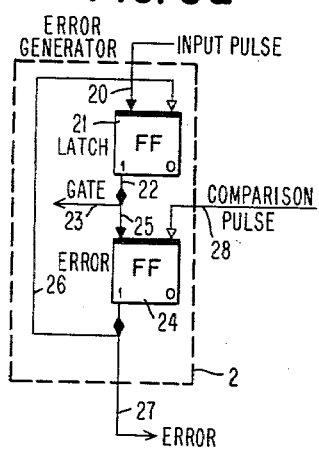
FIG. 6a is a logic diagram of an embodiment of the part of the invention labeled "Error Generator" in FIG. 1.
Figure 6B:
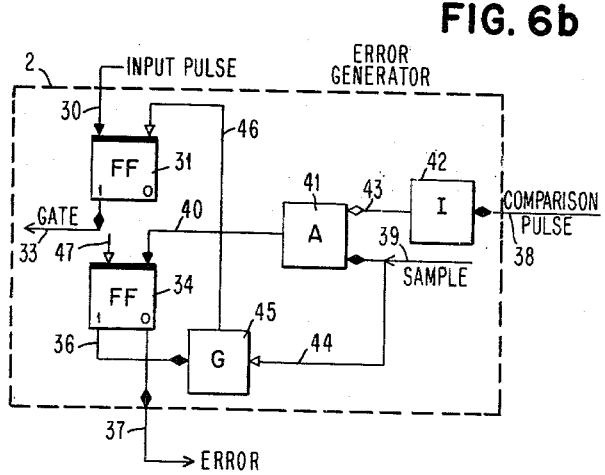

FIGS. 5, 6a and 6b show examples of circuits which may be used for the storage circuit 5 and error generator 2. The counter 1, decoder 4 and comparison means 6 are all well known devices which will be sufficiently understood later from the explanation of the operation of the apparatus for practicing this invention.

FIG. 5 is a logic block diagram of the storage circuit 5. Only three stages are shown, because all stages are identical. Enough stages must be provided to give one storage stage for each line from the decoder, or counter, if no decoder is used. In the embodiment of the invention to be described, a binary counter and a binary to decimal decoder are used. Thus sixteen lines are available; but, conventionally only ten (number zero to nine) need be used.

Each stage of the storage circuit is a gated bistable element. Flip-flops and gates accomplish the same result as the circuit shown in FIG. 5, but are more expensive. An input level on line 10 causes an output from OR circuit 11 on line 12. If a gate level is present on line 13 coincident in time with the level on line 12, AND circuit 14 will have an output on line 15. The line 15 output latches the $r^0$ storage section "ON" via line 16 to OR circuit 11, for as long as the gate level is present on line 13. There is an output from the $r^0$ stage on line 15. Therefore, any stage $r^0$, $r^1$, $r^2$ . . . $r^h$ having an input level on its line from cable 17 will be latched "ON," sending a signal to its line of output cable 18, for as long as the gate line 13 is operated. The storage circuit thus registers which input lines were active, for as long as the gate is operated.

FIGS. 6a and 6b are simplified logic drawings of two error generator embodiments. Each is designed to translate comparison pulse information into an error signal. Each, in addition generates the gate for the storage circuits.

FIG. 6a shows apparatus for generating an error pulse, for each input pulse, which may be blocked by a corresponding comparison pulse. If an input pulse does not result in a comparison pulse, the error pulse is not blocked, indicating an error. In this case an error signal is an error pulse longer than usual. FF's 21 and 24 are initially set to "0." An input pulse (positive going for a negative going pulse operated counter, as will be explained later) on line 20 sets FF 21 to "1" activating output 22, which gates storage circuit 5 via line 23, and sets FF 24 to "1" via line 25.

Note that reset line 26 does not effect FF 21 at this time because the pulse on line 26 has gone positive.

There is an output on error line 27, which should be terminated by an input on comparison line 28 from the storage circuit, if the counter step was correct. A pulse on line 28 sets FF 24 to "0," ends the pulse on the error line 27, and sets FF 21 to "0," cutting off the gate signal on line 23. If the counter step was incorrect no pulse appears on line 28 and both FF's 24 and 21 remain set to "1." The error line 27 thus remains operative until action is taken to correct the trouble.

FIG. 6b shows apparatus for generating a pulse on the error line 37 only when there is a missing comparison pulse on line 38. Otherwise there is no output on the error line 37. A positive going pulse on line 47 initially sets FF 34 to "1." An input pulse on line 30 sets FF 31 to "1" (which was initially set to "0"), emitting a gate signal to the storage section via line 33. Nothing more happens until it is time for a comparison pulse to arrive from the comparison means on line 38. A "sample" pulse is timed to arrive on line 39 at the same time as a comparison pulse is on line 38. If a sample pulse and a comparison pulse arrive simultaneously there will be no output on line 40 of AND circuit 41 because the inverter 42 transforms the positive level comparison pulse on line 38 to a negative level pulse on line 43. AND circuit output 40 is positive going only when the inputs 39 and 43 are positive. This occurs when a sample pulse arrives when there is no corresponding comparison pulse. A missing comparison pulse appears as a negative level on line 38 and a positive level on line 43. Thus FF 34 is set to "0" emitting an error on line 37, if a comparison pulse is missing. The negative going end of the sample pulse resets FF 31 to "0" via line 44 through gate 45 to line 46 if FF 34 is set to "1." If FF 34 indicates an error, FF 31 remains set to "1" until the trouble in the counter is corrected.

The operation of an apparatus embodying the invention will now be described. A binary counter and a binary to decimal converter have been chosen for purposes of explanation, though the counter may function in any numerical system and the decoder may be omitted. The error generator of FIG. 6a has been chosen to explain the operation of the invention, though the device of FIG. 6b, or any other similar circuit, could be used. FIGS. 8 and 9 arranged as shown in FIG. 7 form a logic drawing of a novel apparatus for practicing the invention. FIGS. 10a through 10r are a plot of the waveforms present at various points in FIGS. 8 and 9.

A standard binary counter 1 is stepped the equivalent of one decimal digit for every negative going pulse on input line 700. The order of stepping of individual FF's $FF_1$, $FF_2$, $FF_4$, and $FF_8$ is shown in FIGS. 10b to 10e. Initially all FF's are set to "0." The first input pulse sets $FF_1$ to "1." The "0" output of $FF_8$ holds the gate G "open" but the positive going output of the "1" line from $FF_1$ has no effect on $FF_2$. The second input pulse sets $FF_1$ to "0." The negative going "1" line of $FF_1$ sets $FF_2$ to "1" through gate G. The third input pulse sets $FF_1$ to "1" again, $FF_2$ remaining at "1." The fourth input pulse sets $FF_1$ to "0," and $FF_2$ to "0," via gate G. The negative going "1" line of $FF_2$ sets $FF_4$ to "1." Further stepping changes the state of the counter each time that there is an input pulse, as indicated in FIGS. 10a to 10e. The binary counter 1 is only one example of such a device.

Point "$x$" in FIG. 10c indicates that $FF_2$ has failed to set to "1" upon the seventh input pulse $FF_2$, or its connections, has developed trouble somewhere between the times of input pulse 4 and input pulse 7.

Two sets of lines per counter stage carry the counter information to the next unit. The lines of the first set carry positive pulses whenever the "1" side of a corresponding FF is set. The lines of the second set carry positive pulses whenever the "0" side of a corresponding flip-flop is set. The first set of lines are counter outputs 1, 2, 4, and 8. The second set are counter outputs $\bar{1}$, $\bar{2}$, $\bar{4}$ and $\bar{8}$.

A conventional decimal decoder 4 converts the binary information on counter output lines 1 to 8 and $\bar{1}$ to $\bar{8}$ into decimal information on decoder output lines 0, 1, 2, 3, 4, 5, 6, 7, 8 and 9. For example, AND circuit $A_0$ has a positive output, representative of a zero, only when counter outputs $\bar{1}$, $\bar{2}$, $\bar{4}$ and $\bar{8}$ are activated. This occurs when the counter contents are 0000. All the AND circuits $A_0$ to $A_9$ are operated in accordance with Table I.

Note in Table I that the only AND circuits utilizing information from each counter FF are $A_0$ and $A_1$. It is not essential that every AND circuit connect to every FF; however, accuracy of operation is increased by doing so. For instance, an extra input $\bar{2}$ to AND circuit $A_9$ could be made. The connections shown for decoder 4, and those omitted, are discretionary to a large extent. The essential connections are indicated by two crosses in Table I. The non-essential connections used to increase accuracy of operation are indicated by single crosses.

*Table I*

| AND | $\bar{1}$ | 1 | $\bar{2}$ | 2 | $\bar{4}$ | 4 | $\bar{8}$ | 8 |
|---|---|---|---|---|---|---|---|---|
| $A_0$ | XX | | XX | | XX | | XX | |
| $A_1$ | | XX | X | | X | | X | |
| $A_2$ | X | | | XX | X | | | |
| $A_3$ | | XX | | X | XX | | | |
| $A_4$ | X | | X | | | XX | | |
| $A_5$ | | XX | X | | | XX | | |
| $A_6$ | X | | | XX | | XX | | |
| $A_7$ | | XX | | XX | | XX | | |
| $A_8$ | X | | | | | | | XX |
| $A_9$ | | XX | | | | | | XX |

Single line transfer is used between the decimal decoder 4 and the storage circuit 5, there being ten lines representing the numbers 0, 1, 2, 3, 4, 5, 6, 7, 8 and 9. In normal operation, one and only one of these lines should carry information at any one time.

The storage circuit 5 has been described previously. It functions to store the decimal equivalent of the counter contents before each input pulse and after each input pulse. Therefore, if the counter contains the value 0000 initially, the zero output of the decoder will remain energized by the $\bar{1}$, $\bar{2}$, $\bar{4}$, and $\bar{8}$ outputs of the counter. The first input pulse (negative going edge) should step the counter to 0001, energizing the counter outputs $\bar{1}$, $\bar{2}$, $\bar{4}$ and $\bar{8}$ and finally activating decoder output one. The same input pulse (positive going edge) sets latch FF 301 to "1" activating the storage circuit gate line 333, after a short flip-flop setting delay.

Note that the counter 1 is stepped by a negative going input pulse, whereas the latch FF 301 is set by a positive going input pulse. In other words the leading edge of the input pulse sets the FF and the trailing edge steps the counter. This will be clear after an inspection of FIGS. 10a to 10c and 10f. Input pulse 1 sets latch FF 301 when positive going; and, binary $FF_1$ when negative going.

Gate line 333 therefore operates the storage circuit 5 upon the reception of the positive going end of the input pulse, but before the counter is stepped. In the last example, decoder output line zero is still energized at the time the gate line 333 is activated resulting in operation of storage section $r_0$ as explained previously with reference to FIG. 5. The counter steps to its next state, which should be 0001, upon reception of the negative going end of the input pulse on line 7. The decoder converts this to a one, which is recorded in storage section $r_1$, because gate line 333 is still operative. The storage section $r_0$ remains in the same state as before, due to the latching loop 501, though decoder output zero is deactivated once the counter has stepped. Thus, the storage circuit 5 contains the representations of two decimal digits: zero and one.

Comparison means 6 consists of a number of AND circuits, one for each counter step transition, and an OR circuit 601. Each AND circuit connects to two adjacent storage sections. For example, AND $A_{01}$ connects to storage sections $r_0$ and $r_1$. There will be an input to OR circuit 601 whenever two adjacent storage sections are operated. There will be no input to the OR circuit if only one storage section is operated, or if non-adjacent sections are operated. In the illustration, storage sections $r_0$ and $r_1$ are operative. The outputs from these two sections enter AND circuit $A_{01}$ causing an input to OR circuit 601 over line 0–1. A comparison pulse, indicating a successful counter step transition, therefore is initiated on line 688 at the time of a correct counter step.

When latch FF 301 operated the gate line 333, it also set error FF 302 to "1," as is seen from FIGS. 10f to 10h. A delay is inherent in the FF circuit used. The comparison pulse on line 688 now sets error FF 302 to zero, setting latch FF 301 to zero through line 303. As is shown in FIG. 10g, the error FF output "1" is normally turned ON and OFF for each successful counter step. If there is an error, it stays ON, keeping the latch FF ON also.

The gate line 333 is deactivated after each successful step. A comparison pulse, indicating a correct counter transition, sets the error FF and after a delay, sets the latch FF to "0" making the gate line 333 inoperative. Information recorded in the storage circuit 5 is lost once gate line 333 is deactivated, and the comparison pulse is ended.

The next input pulse rise sets the latch FF to "1" making the gate line operative, thus recording the present state of the counter in the proper storage section, and setting the error FF to "1." In the example, storage section $r_1$ is operated. The fall of the input pulse steps the counter, resulting in operation of the next storage section in the sequence ($r_2$ in the example). Storage output lines 1 and 2 operate AND circuit $A_{12}$ sending a new comparison pulse through OR circuit 601 to set the error FF to "0," as before, setting the latch FF to zero, ending the gate and comparison pulses.

This operation is continued until an error is encountered or the tenth pulse is reached.

FIGS. 10c, 10i and 10p illustrate the effect of an error on the waveforms present in the apparatus. If the binary $FF_2$ fails to set to "1" (point $x$) on the negative going end of the seventh input pulse, no comparison pulse is generated (points $z$ and $y$) and both the error FF (FIG. 10g) and latch FF (FIG. 10f) remain set to "1." Subsequent input pulses will continue stepping the counter; but, the error FF will remain set to "1" until a comparison pulse is generated on line 688. The time at which this occurs depends upon the particular error. If, as shown, binary $FF_2$ fails between the fourth and seventh input pulse, the next comparison pulse will not be generated until the ninth pulse, because no two adjacent storage sections are operated before then. It will be obvious that there may be provided means for permitting an error signal to block further stepping of the counter.

Line 602 of comparison means 6 is used if the counter being checked is used to count higher than nine. It is only necessary to supply extra decoder and storage stages, and additional AND circuits for the comparison means.

In summary, an invention has been described for checking the stepping sequence of a counter by comparing the states of the counter before and after stepping. This overcomes the shortcomings of the prior art. The preferred embodiment described includes means for achieving fail-safe operation.

While the invention has been particularly shown and described with reference to preferred embodiments thereof, it will be understood by those skilled in the art that the foregoing and other changes in form and details may be made therein without departing from the spirit and scope of the invention.

In the claims:

1. Apparatus for checking the failure of a stepping pulse to correctly change a counter's state to one of a number of predetermined states of a sequence of distinguishable states comprising: storage means for storing the states of the counter before and after application of said stepping pulse; comparison means associated with said storage means for comparing the stored states and generating a blocking signal, if the counter has changed states correctly; means responsive to said stepping pulses, for generating one error pulse for each stepping pulse; and gating means responsive to said error pulse and blocking signal for blocking further transmission of any of said error signals which correspond with a blocking signal.

2. Apparatus for checking the failure of an input pulse to correctly change a counter's state from a first state of a predetermined sequence of distinguishable states to a second or a third state of the sequence comprising; a decoder connected to the counter for converting the numerical values of the counter states to the decimal equivalents; storage means connected to the decoder, for storing the decimal equivalent of the states of the counter before and after application of said input pulse; comparison means connected to the storage means for comparing the adjacent stored states to determine whether the counter has changed states in the predetermined sequence and for generating a first pulse if the counter has changed states correctly; and error means responsive to the absence of said first pulse, for generating a signal indicating a failure of the counter to change its state in the proper sequence.

3. Apparatus for checking the failure of a stepping pulse to correctly change a binary counter's state from one state equivalent to a first decimal number to another state equivalent to a second decimal number adjacent said first decimal number in value comprising; a decoder connected to the counter for converting binary values to decimal values, storage means connected to said decoder for storing the decimal equivalent of the states of the counter before and after application of the stepping pulse; comparison means connected to the storage means for comparing adjacent stored states to determine whether the decimal equivalent value of the counter has changed from one value to an adjacent value and for generating a first signal if the counter has changed states correctly; and means responsive to the absence of said first signal for generating a second signal identifiable as a failure of the counter to change its state in the proper sequence.

References Cited by the Examiner
UNITED STATES PATENTS

| 2,636,672 | 4/53 | Hamilton et al. | 340—172.5 |
| 2,685,683 | 8/54 | Holden et al. | 340—253 |
| 2,854,653 | 9/58 | Lubkin | 235—153 |

OTHER REFERENCES

IBM Tech. Disclosure Bulletin, December 1959, vol. 2, No. 4, pp. 66 and 67.

MALCOLM A. MORRISON, *Primary Examiner.*

CORNELIUS D. ANGEL, *Examiner.*